United States Patent [19]

Arizabalaga

[11] 4,146,880

[45] Mar. 27, 1979

[54] METHOD OF FINDING THE ADDRESS OF A ZONE INDICATED ON A VIDEO SCREEN BY A LIGHT PEN

[75] Inventor: Denis Arizabalaga, Massy, France

[73] Assignee: Transac - Compagnie Pour le Developpement des Transactions Automatiques, Paris, France

[21] Appl. No.: 821,056

[22] Filed: Aug. 1, 1977

[30] Foreign Application Priority Data

Aug. 4, 1976 [FR] France .............................. 76 23807

[51] Int. Cl.² ............................................ G06K 15/20
[52] U.S. Cl. ................................. 340/707; 340/711; 340/749
[58] Field of Search .................... 340/337, 324 AD; 250/549

[56] References Cited

U.S. PATENT DOCUMENTS

| | | | |
|---|---|---|---|
| 3,569,617 | 3/1971 | Allen et al. | 340/324 AD |
| 3,895,375 | 7/1975 | Williams | 340/324 AD |
| 3,997,891 | 12/1976 | Iwamura et al. | 340/337 |

*Primary Examiner*—David L. Trafton
*Attorney, Agent, or Firm*—Sughrue, Rothwell, Mion, Zinn and Macpeak

[57] ABSTRACT

On a video screen displaying lines of characters, a character position, whether displaying a character or blank, is found by means of a search performed after a light pen indicates the desired position. The search is performed by brightening the screen phosphor above its usual level of brightness with a search symbol that scans the character lines to determine the line of the character and then searches for its position along that line.

7 Claims, 5 Drawing Figures

METHOD OF FINDING THE ADDRESS OF A ZONE INDICATED ON A VIDEO SCREEN BY A LIGHT PEN

The invention relates to a method for finding the co-ordinates of a zone of a video screen by means of a light pen. And in particular the invention relates to finding the address of a message displayed on a video screen.

Light pens for finding the address of a video message are known: they comprise a photodiode or photo-transistor and associated amplifier; the photodiode (or photo-transistor) is mounted in the tip of a rod of much the same size and shape as a pencil or fountain-pen.

The tip of the light pen is placed on the character on the video screen of which the address is to be found.

As it is known, characters are composed of a number of light spots produced in succession by electron scanning of the video screen. Only one spot is scanned at any one time, and it is the remanence of the eye and the screen phosphor that enable an image to be formed from the above-mentioned spots.

The spots are generally excited by electron scanning in lines going from left to right and from top to bottom. After each complete scan of the screen the line scanning cycle starts again.

A complete scan of the screen is called a field.

In the interlaced scanning mode two fields are necessary to produce an image.

Thus, the light pen will respond to passage of the light spot through a point of the screen, and logic circuitry associated with it determines the address the character pointed to counting a number of clock pulses corresponding to the number of characters between the top of the screen and the character pointed to.

Such a system will function only if the phosphor dots respond rapidly to excitation, and have a light remanence that is short in relation to the period of the field cycle, and if the response of the photodiode is also rapid.

Relatively fast-responding photodiodes can be produced, but phosphor remanence is not determinable. Thus, the system outlined above cannot work with certain phosphors, such as P39, which is strongly remanescent. Indeed, P39 takes 100 milliseconds to lose brightness down to 10%, this period being equal to 7 fields at the usual field cycle frequency of 60 Hz. This remanence is not compatible with known systems.

One of the purposes of the invention is thus to provide a method for finding a video character addresses with a light pen, on high remanence screens.

A further purpose is to provide a method for finding not only the line of the character but also its position along that line.

A still further purpose of the invention is to find out the co-ordinates of a zone of a video screen even when there is no character in the zone pointed to by the light pen.

The present invention provides a method for finding the line address of a zone of a video screen, the zone being indicated by a light pen and the method comprising the following operations:

placing the light pen on the selected zone whose address is sought;

this triggers a first scan of the screen by the cathode ray in the form of a group of brightened spots forming either a cursor travelling below the lines of displayed characters, or a patch of much the same size as a character and covering the characters as it travels, said cursor or patch skipping n scanning lines after each character line scan, so as to scan successive character lines, the cursor or patch is halted when detected by the light pen, and as each character line scan steps a line counting register by one unit which also stops on detection the final value Y stored in that register represents the address of the line sought.

The invention also provides a method for finding the position of a zone in a given line of a video screen, the zone being indicated by a light pen, and the method comprising the following operations:

placing the light pen on a selected zone whose address is sought;

this triggers scanning of the screen by a group of brightened spots forming either a cursor under the line of characters or a patch of much the same size as a character and covering the characters as it travels, said scanning being performed as follows:

a first scan with all characters up to the 63rd blanked out in the selected line, and a register having at least 7 bits set to contain value 64 in binary;

if response is obtained from the pen, value 64 is retained in the register, if not, the register is cleared;

a second scan with 32 characters from X1 + 32 is displayed, all others blanked out, X1 being the value stored in the register at the end of the first scan;

if a response is obtained, 32 is stored, unless X1 + 32 is greater than the total number of characters in the line, in which case it is not;

several such scans are made;

at scan n, $64/2^{n-1}$ characters from $X1 + X2 + \ldots + Xn-1 + 64/2^{n-1}$ are displayed, the others blanked out, the value stored in the register being then $X1 + X2 \ldots + Xn-1$, value $64/2^{n-1}$ is added if pen response is obtained and if $X1 + X2 \ldots + Xn-1 + 64/2^{n-1}$ is not greater than the number of characters per line;

after seven scans have been made, the address of the character is the count in the register.

An embodiment of the invention is described by way of example with reference to the accompanying drawings, in which.

Figure 3:
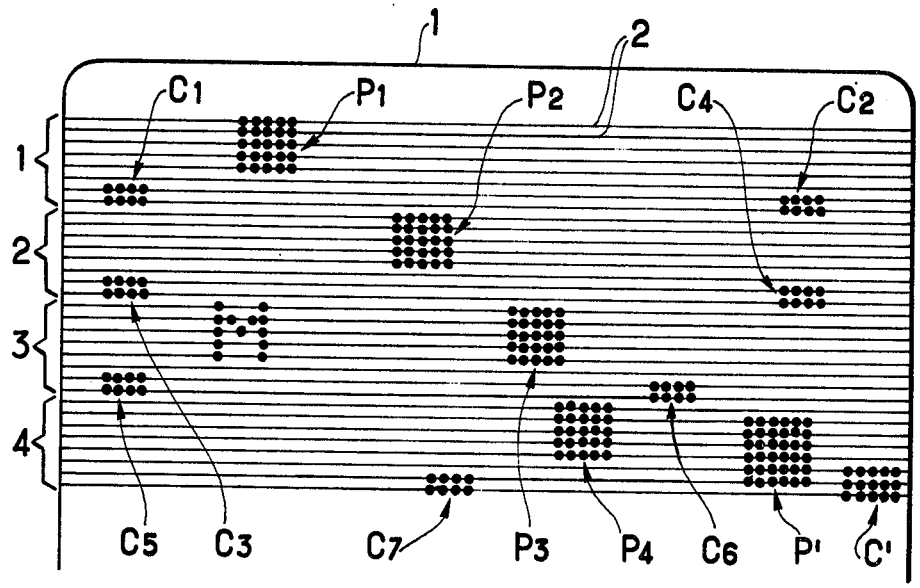
Figure 4:
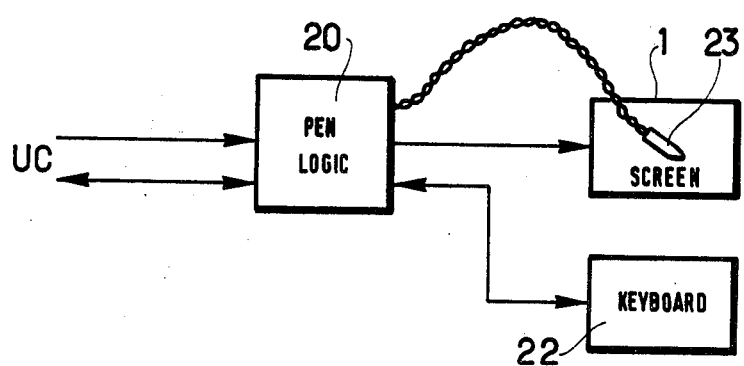

FIG. 3, schematically represents the operations involved in finding the address of the line of a character;

FIG. 4, is a block-diagram of the device implementing the method; and

Figure 5:
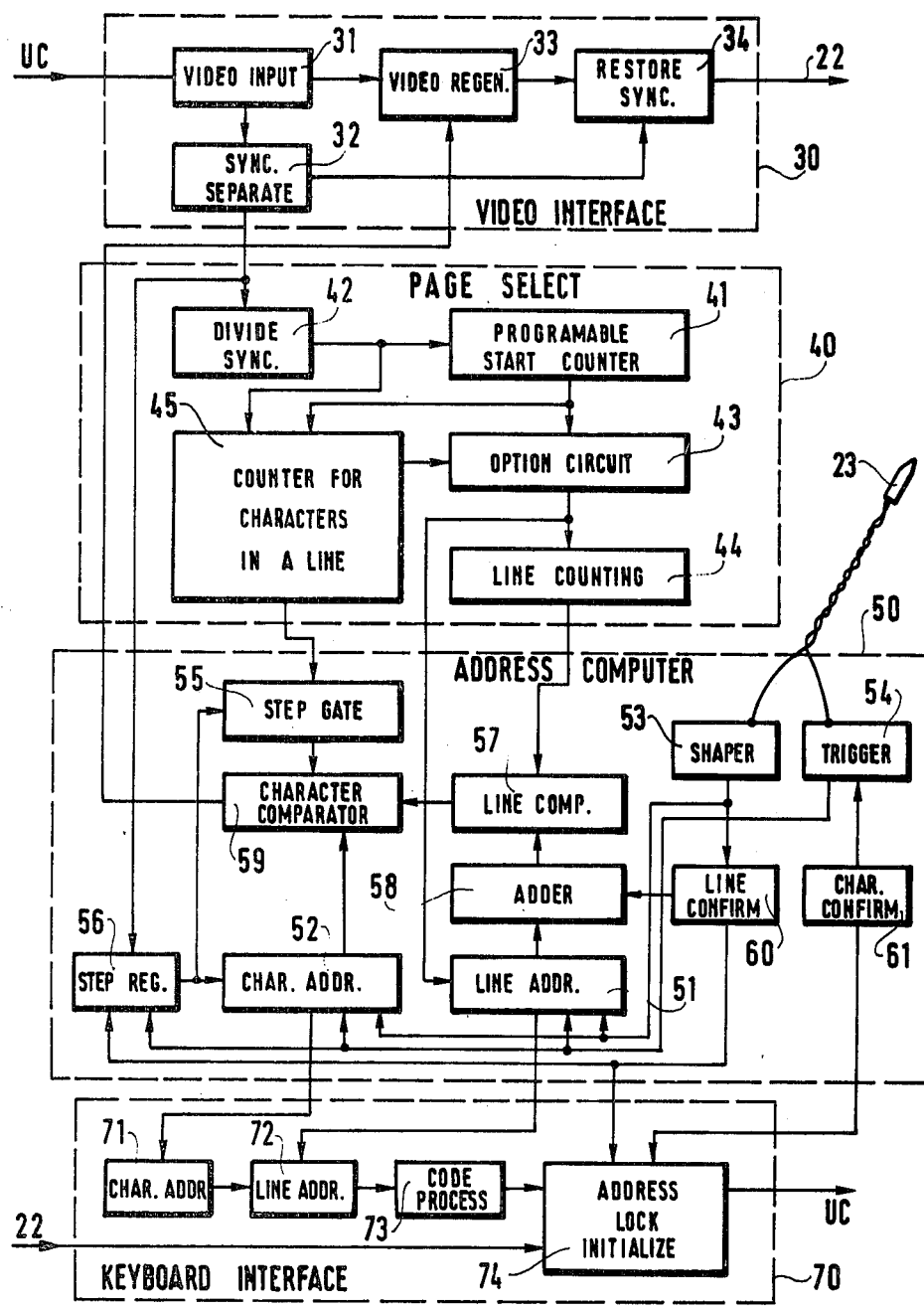

FIG. 5, is a more detailed block-diagram of the said device.

The example chosen to illustrate the process, is that of a 525-line screen, with interlaced scanning at 60 Hz field frequency and 15,750 Hz line frequency, 80 characters per line. Field scan takes 16,660 microseconds, line scan takes 63.5 microseconds.

Figure 1:
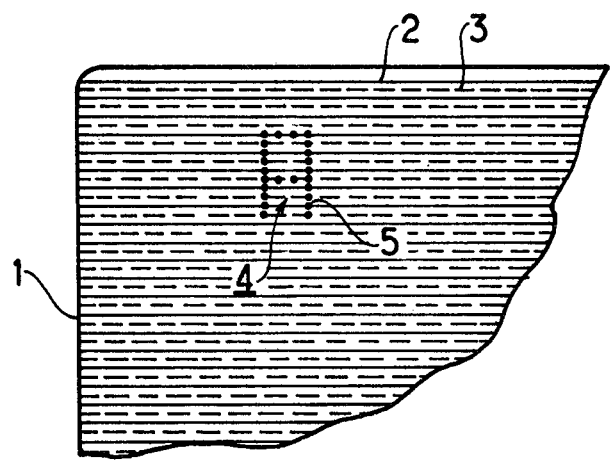
FIG. 1, represents part of a video screen displaying a character.

FIG. 1 represents a portion of said screen 1. Even-number lines 2 are shown as unbroken lines, and odd-number lines 3 are shown as broken lines. A character 4 (in this case an "A") is shown, composed of spots. Such a screen can display up to 32 lines of characters: capitals occupy 10 scanning lines (5 even + 5 odd), and small letters occupy 8 scanning lines (4 even + 4 odd). Line spacing is 6 or 4 scanning lines, according to whether characters are small or capital letters.

Character width is 4 (black or white) spots maximum, and character spacing is equal to 3 spots: thus, a spot is swept in 0.064 μs, a character space in 0.192 μs, and the width of a character in 0.448 microseconds.

Figure 2:
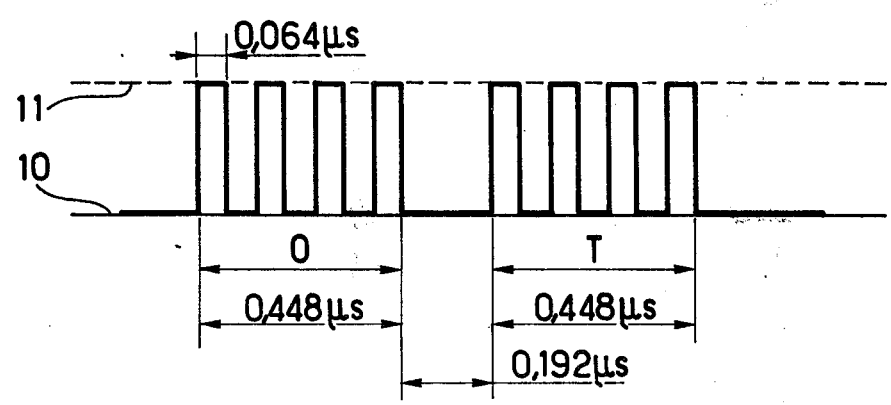
FIG. 2, represents the luminosity on the screen of parts of characters.

FIG. 2 represents a line of characters in which the tops of an O and a T (seven spots in total each), separated by a blank interval of 3 spots. Line 10 in the figure represents the black level, and broken line 11, the white level.

It will be understood that if the tip of the light pen is on the last spot of the top of the O, character address will be correct if the response of its photodiode is faster than about 0.160 s. If it is slower, the address found will be that of the next character, T.

The first problem to be solved arises out of the fact that photodiodes with a speed of response of as fast as 0.160 microseconds do not seem to be available.

A second problem to be solved, in the case of a high remanence P39 screen, relates to sensitivity: the photodiode will not be able to detect the difference in the brightness of a spot which exists between the instance it is swept and just before. However, it can detect the difference in luminosity between a normally excited spot and spot brightened by increasing the "Wehnelt" voltage.

Thus, the sensitivity problem is solved, in the invention, by triggering the passage of a brightened cursor or rectangular solid array ("patch") of spots, at the instant the search operation being started by placing the tip of the pen on a given character.

In searching for the character line number (Y coordinate), the cursor goes along each line of characters in succession dropping 8 scanning lines of a field, when, for example, the characters are capitals. FIG. 3 represents an example of this, using a cursor.

The even-number scanning lines are shown, defining character lines 1, 2, 3, 4, etc., in groups of 8 scanning lines.

The cursor, composed for example of eight brightened spots on two adjacent scanning lines (4 per line), is controlled to sweep the lowest two scanning lines of each character line. Start of travel is triggered by pressing the tip of the light pen on the desired character, in this case the "M" in character line "3".

Thus, the cursor travels along the last two scanning lines of character line "1", from C1 to C2, then skips to the start of the last two scanning lines of character line "2", from C3 to C4, and so forth.

At C5, it starts sweeping charaacter line "3" containing the said "M".

A counter was started at the triggering of the cursor first sweep, and is stepped to count the scanning lines in groups of 8, therefore going from an initial 1, to 2, 3, etc. Said counter is also controlled to stop on detection of the cursor by the pen which stops at the instant also.

However, because of the response time of the pen's photodiode and depending on its position, the cursor may be either on the right character line (at C6, for example), or on the next line (C7), or even further on. To resolve this uncertainty of one or several units in the address sought, a second field scan is triggered, with the counter storing the previously loaded Y value, and blanking out character lines Y − 1 and Y + 1 (lines "2" and "4").

If the pen responds at the second field scan, then Y is correct. If it does not, 1 is subtracted from the counter and a third field scan is triggered, with character lines $(Y-1)-1$ and $(Y-1)+1$ blanked out (i.e. lines 1 and 3 in this case). If the pen responds, Y−1 is correct, and the character's position in the line may now be found. If it does not respond, the operation is repeated, blanking out lines $(Y-2)+1$, with the count reduced to Y−2, and again, if the pen responds, Y−2 is the correct line number.

If confirmation is still not obtained, a further attempt is made with line $(Y+1)+1$ and $(Y+1)-1$ blanked out. Failing to obtain response, meaning that Y+1 is not correct, further seach is repeated around Y, for (Y−1), (Y−2), (Y+1), three times, for example. If no response is obtained, a new cycle is started.

As a general rule, confirmation is obtained for Y or (Y−1), operation (Y−2) being performed only in cases of exceptionally delayed response.

A variant of the process is shown in FIG. 3, whereby a moving patch of spots is used instead of the cursor. The patch is composed of a square array of 25 spots sweeping the first five scanning lines of each character line: the various positions of the patch on the character lines are shown (P1, P2, P3, P4, respectively on character lines "1", "2", "3", and "4").

The search process is identical to that described, substituting "patch" for "cursor".

It is of course possible to use patches of other sizes, and differently disposed on the line while remaining within the scope of the invention.

A path of 36 spots on scanning lines 2 to 7 of character line "4" is shown at P' in FIG. 3.

Similarly, the cursor may be composed of 3 rows of 5 spots (C') or of any other shape appropriate for application of the process described.

The search around Y+1 mentioned earlier may be rendered necessary in cases of exceptional brightness. Scanning with a high-speed moving patch may slightly increase the size of the image, and shift it in relation to the tip of the pen. The counter mentioned above is preferably a 6-bit register, termed the "line register".

The search for the character's position (X coordinate) is performed with a "character register" of 7 bits capacity, and hence amply capable of counting the 80 characters of a line.

The register is initially set to read 64. The characters from the 64th to the end of the line are brightened, the others blanked out. Lines Y−1 and Y+1, may also be blanked out at the same time.

A cursor or patch scans the line. If the pen responds, a "64" bit is stored in the register. If not, the register is cleared.

Next, 32 characters from X1 + 32 are brightened, and the others darkened, X1 = 0 or 64, according to whether a response was obtained, or not, in the previous scan.

If a pen response is obtained, a "32" bit is stored in the register. If not, it is not. 32 will not be stored if X1 + X2 is greater than 80 (maximum number of characters per line).

Next a third sweep is made with 16 characters from X1 + X2 + 16 brightened, the others blanked out with X1 = 0 or 64 and X2 = 0 or 32 according to the results of previous scan. If a response is obtained, a "16" bit is stored for X3, if no response results, or if X1 + X2 + 16 > 80, it is not.

The scan n is run with $64/2^{n-1}$ characters from $X1 + X2 \ldots + X(n-1) + 64/2^{n-1}$ brightened, the others blanked out.

A "$(64/2^{n-1})$" bit being stored on response provided the sum is not greater than 80.

On the seventh scan, the character in position X1 + X2 ... + X6 + 1 is brightened, all others blanked out, with the character register reading the foregoing accumulated bits of values 0 or 64, 32, 16, 8, 4, 2, in positions X1 to X6 respectively, a 1 is lodged in X7; if a response is obtained, it is held, otherwise, the position is cleared.

An 8th scan follows, for confirmation, with the register as filled, only the one character previously identified brightened, all others blanked out, lines Y−1 and Y+1 blanked out.

Failing confirmation by pen response, a second search is started.

FIG. 4 is a block diagram of a device for performing the method. A block 20 represents the electronics associated with the pen. It performs the functions of:
  video interfacing
  selection of page and option
  address computing
  keyboard interfacing
  address transmission The electronic circuit 20 is connected between the computing unit UC and the screen 2, interfacing UC with the keyboard 22, installed near the screen 1, and connected to the light pen 23.

FIG. 5 is a more detailed block diagram of 20, which comprises subassemblies:
  video interface 30
  page select circuit 40
  address computer 50
  keyboard/screen and keyboard/computing unit interface 70.

Circuit 30 comprises video input 31, sync. signal separator circuit 32, circuit 33 regenerating the video signals and adding the output of character comparator 59 from subassembly 50, and a sync. restoring mixer 34 sending the processed video signals to the screen 22.

Subassembly 40 comprises a number of page and option selecting circuits, in particular programable counting registers 41 determining the synchronizing of operations on the first line and character, driven by oscillator-synchronous divider 42; an option circuit 43 for scanning line segment counting and character line spacing; a synchronized counter 44 for scanning line counting and segment group sampling (groups of 8, for example); synchronized counter 45 for character counting per line.

The above option circuits provide display layouts of various formats (64/80, 32/40, dual, etc.).

Subassembly 50 comprises the "line" and "character" address registers, respectively 51 and 52, with pen output shaping circuit 53 (23 is the pen), a search command triggering circuit 54, a step-by-step gating circuit 55, a step-by-step register 56, a line comparator 57 with adder 58, a character comparator 59, a line search comfirmation circuit 60, and a character search confirming circuit 61.

Interface 70 comprises character address receiver 71, line address receiver 72, address code processer 73, and coded address locking initialiser 74.

By reason of the process according to the invention, the electronics are easy to use and provide the possibility of confirming addresses. They also protect the system against errors due to disturbance by ambient light, particularly as due to neon lamps: the effect of such lamps results in complete loading of the character register within 150 milliseconds. Complete loading of the register (value 128) is treated as a malfunction, the maximum character count per line accepted by the system being 80 (i.e. the actual number of characters per line). The abnormal count (> 80) is rejected.

Total search time is 166 to 199.92 milliseconds.

The system may be used with all types of screen, and requires no modification for use with all terminals.

The cursor or path may be stopped on the character indicated by the operator with the pen, for position checks.

Addresses, held in the registers, may be used for all such operations as deletion, correction, etc.

What I claim is:

1. Method for finding the line address of a zone of a video screen, the zone being indicated by a light pen and the method comprising the following operations:
  placing the light pen on the selected zone whose address is sought;
  this triggers a first scan of the screen by the cathode ray in the form of a group of brightened spots forming either a cursor travelling below the lines of displayed characters, or a patch of much the same size as a character and covering the characters as it travels, said cursor or patch skipping n scanning lines after each character line scan, so as to scan successive character lines,
  the cursor or patch is halted when detected by the light pen, and as each character line scan steps a line counting register by one unit which also stops on detection the final value Y stored in that register represents the address of the line sought,
  a second scan is then performed, lines Y+1 and Y−1 being blanked out and the inhibited Y register containing value Y, said value being the final result if the pen detects a light signal, and the count register being reduced by 1 if no such detection results.

2. The method according to claim 1, in which a third scan is performed if no signal was detected in the second scan, said third scan taking place with lines Y and Y−2 blanked out, and the counter holding value Y−1, the final result being Y−1 if the pen detects a signal, and the count being reduced by a 1 in the contrary case.

3. The method according to claim 2, in which absence of light pen response in the third scan triggers a fourth, with lines Y−3 and Y−1 blanked out and the counter storing Y−2 this value being the final result if the light pen responds, and the cycle of operation be re-started from the beginning, in the contrary case.

4. A method for finding the position of a zone in a given line of of a video screen, the zone being indicated by a light pen, and the method comprising the following operations:
  placing the light pen on a selected zone whose address is sought;
  this triggers scanning of the screen by a group of brightened spots forming either a cursor under the line of characters or a patch of much the same size as a character and covering the characters as it travels, said scanning being performed as follows:
  a first scan with all characters up to the 63rd blanked out in the selected line, and a register having at least 7 bits set to contain value 64 in binary;
  if response is obtained from the pen, value 64 is retained in the register, if not, the register is cleared;
  a second scan with 32 characters from X1 + 32 displayed, all others blanked out, X1 being the value stored in the register at the end of the first scan;

if a response is obtained, 32 is stored, unless $X1 + 32$ is greater than the total number of characters in the line, in which case it is not;

several such scans are made;

at scan n, $64/2^{n-1}$ characters from $X1 + X2 + \ldots + Xn-1 + 64/2^{n-1}$ are displayed, the others blanked out, the value stored in the register being then $X1 + X2 \ldots + Xn-1$, value $64/2^{n-1}$ is added if pen response is obtained and if $X1 + X2 \ldots + Xn-1 + 64/2^{n-1}$ is not greater than the number of characters per line;

after seven scans have been made, the address of the character is the count in the register.

5. The method according to claim 4 in which said cursor or patch is brightened.

6. Method for finding the line address and position of a zone of a video screen, the zone being indicated by a light pen and the method comprising the following operations:

placing the light pen on the selected zone whose address is sought;

this triggers a first scan of the screen by the cathode ray in the form of a group of brightened spots forming either a cursor travelling below the lines of displayed characters, or a patch of much the same size as a character and covering the characters as it travels, said cursor or patch skipping n scanning lines after each character line scan, so as to scan successive character lines, the cursor or patch is halted when detected by the light pen, and as each character line scan steps a line counting register by one unit which also stops on detection the final value Y stored in that register represents the adress of the line sought, then scanning of the Y line being performed as follows:

a first scan with all characters up to the 63rd blanked out in the selected line, and a register having at least 7 bits set to contain value 64 in binary;

if response is obtained from the pen, value 64 is retained in the register, if not, the register is cleared;

a second scan with 32 characters from $X1 + 32$ displayed, all others blanked out, X1 being the value stored in the register at the end of the first scan;

if a response is obtained, 32 is stored, unless $X1 + 32$ is greater than the total number of characters in the line, in which case it is not;

several such scans are made;

at scan n, $64/2^{n-1}$ characters from $X1 + X2 + \ldots + Xn-1 + 64/2^{n-1}$ are displayed, the others blanked out, the value stored in the register being then $X1 + X2 \ldots + Xn-1$, value $65/2^{n-1}$ is added if pen response is obtained and if $X1 + X2 \ldots + Xn-1 + 64/2^{n-1}$ is not greater than the number of characters per line;

after seven scans have been made, the address of the character is the count in the register.

7. The method according to claim 6 in which the cursor or patch stops at the zone of which the position has been identified.

* * * * *